M. G. FARMER.
Electric Battery.
No. 9,530.
Patented Jan. 11, 1853.
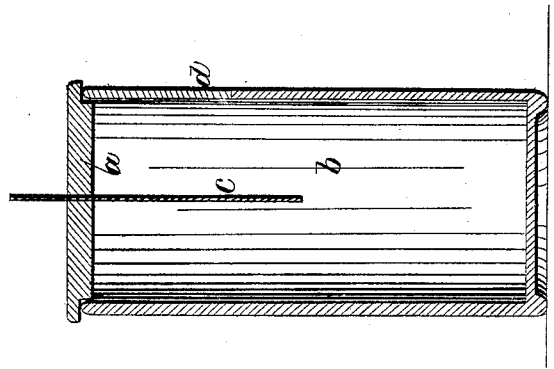
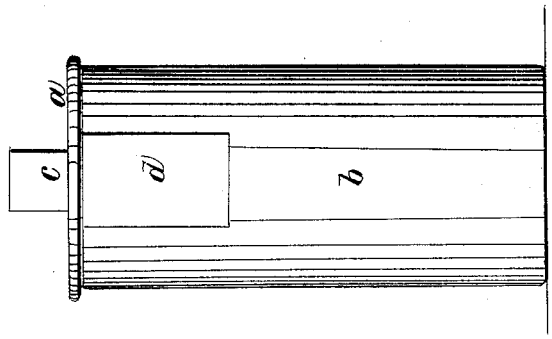

UNITED STATES PATENT OFFICE.

MOSES G. FARMER, OF SALEM, MASSACHUSETTS.

IMPROVEMENT IN POROUS CELLS FOR GALVANIC BATTERIES.

Specification forming part of Letters Patent No. 9,530, dated January 11, 1853.

*To all whom it may concern:*

Be it known that I, MOSES G. FARMER, of Salem, in the county of Essex and State of Massachusetts, have invented a new Improvement in Porous Cells for Galvanic Batteries; and I do hereby declare that the same is fully described and represented in the following specification and the accompanying drawings, letters, figures, and references thereof.

Of the said drawings, Figure 1 denotes a front elevation of one of my improved cells. Figure 2 is a vertical central and transverse section of it.

The common porous cells, as heretofore made, are generally constructed of unglazed earthenware, porcelain, or some suitable substance that is porous to such extent as will allow of the passage through it of the nitric acid or liquid when placed within it.

In consequence of making the whole vessel porous, or so that the electricity can pass through any part of it, a great waste of the liquid necessarily follows. This liquid or nitric acid, after having passed through the sides and bottom of the cell and into the sulphuric acid or liquid surrounding the exterior surface of the cell, attacks the mercury of the amalgamated zinc placed in the surrounding cistern, and is productive of serious injury to the same.

In order to prevent the evaporation of the acid in the porous cell, I have applied a suitable cover to it, as seen at *a* in Figs. 1 and 2. This cover I make of earthenware or of the same material as the cell *b*, and while it is in a soft or plastic state I puncture it through its middle and insert the strip of platina *c*, afterward pressing or closing the plastic material close against the platina, so as to firmly hold it in place. When this has been done the cover is left to dry and is afterward glazed and baked in the usual way, the platina being fixed in and to the cover by the process of hardening the cover by heat.

Instead of making the whole vessel porous, I so construct it that only a part, *d*, of it shall be so, the remainder being impervious to the passage of a liquid through it. For this purpose I leave a space or part, *d*, both on the outside and inside surfaces unglazed, and I glaze the remainder of the surfaces of the cell. The electricity can thus pass freely through the small unglazed or porous part *d*, while it, as well as the liquid in the vessel, is prevented from passing through those parts of the surface that are protected by the glazing. There may be other modes of rendering impassable to liquids all that part of the cell except the part *d*. The surface both inside and outside of the vessel, or on either, may be covered with some suitable varnish or composition, which, while it is unattackable by the acid, will prevent the flow of the liquid through such part of the vessel where it is applied. From the above it will be seen that by my improved cell the injurious effects or action of the nitric acid on the zinc is nearly, if not entirely, arrested.

The above-described mode of fixing the strip of platina in the cover will be found to present great advantages, as it is not only at once durably or firmly fixed in place, but is rendered incapable of being loosened by the corroding action of the acid used in the vessel.

The common porous cells, as heretofore used in a Grove's Battery, have never, as far as my knowledge extends, been provided with suitable covers. As commonly used and made of porous material, each contains and is formed of a size to hold about one-sixth of a pound of nitric acid, and it requires to be charged with fresh acid about every forty-eight hours while in use. The strength of the acid has been so far expended in that time as to render it no longer sufficiently energetic in such a battery.

My improved cell, being porous only in a small portion of it, or being glazed over its surface excepting a small portion of it, which is so left unglazed as to suffer the electricity to pass through only a portion of the sides of the vessel, as above described, I construct of a size and depth sufficient to hold about sixteen times as much as those of the old kind. I have set up two of these with the acid which I had taken from a battery of the old kind of cells, and which acid by usage therein had been rendered unfit for further employment in the same. With the said new cells and impaired acid I obtained a magnetizing power equal to what one of the old cells would give when charged with fresh acid. The new cells thus charged were kept in constant action for eight days, at the expiration of which time they gave about twenty-five per cent. more power than on the first day.

I claim as my invention—

The improved cell as made, substantially as described, viz., with a part only of it porous, or so as to permit the electricity to pass from the nitric acid or liquid within it through such part and into liquid surrounding the cell, the remainder of the cell being made, by glazing or other means, impervious to the passage of electricity and acid or liquid through it, as specified.

In testimony whereof I have hereto set my signature this 4th day of September, A. D. 1852.

MOSES G. FARMER.

Witnesses:
R. H. EDDY,
GEO. W. CUTLER.